United States Patent
Eom et al.

(10) Patent No.: US 8,656,475 B2
(45) Date of Patent: Feb. 18, 2014

(54) METHOD AND SYSTEM FOR CONTROLLING ACCESS FOR MOBILE AGENTS IN HOME NETWORK ENVIRONMENTS

(75) Inventors: Young Ik Eom, Seoul (KR); Kwang Sun Ko, Seoul (KR); Hyun Su Jang, Seoul (KR); Hyun Jin Cho, Seoul (KR); Yong Woo Jung, Seoul (KR); Hyun Woo Choi, Seoul (KR); Gye Hyeon Gyeong, Seoul (KR); Jung Hwan Choi, Seoul (KR); Zhen Zhao, Seoul (KR); Tae Hyoung Kim, Seoul (KR); Youn Woo Kim, Seoul (KR)

(73) Assignee: Sungkyunkwan University Foundation for Corporate Collaboration, Gyeonggi-Do (KR)

( * ) Notice: Subject to any disclaimer, the term of this patent is extended or adjusted under 35 U.S.C. 154(b) by 1517 days.

(21) Appl. No.: 12/032,817

(22) Filed: Feb. 18, 2008

(65) Prior Publication Data
US 2009/0113538 A1    Apr. 30, 2009

(30) Foreign Application Priority Data
Oct. 31, 2007    (KR) .......................... 10-2007-0110536

(51) Int. Cl.
*G06F 15/16*    (2006.01)
*H04L 29/06*    (2006.01)

(52) U.S. Cl.
CPC ......... *H04L 63/0807* (2013.01); *H04L 63/0876* (2013.01); *H04L 63/0884* (2013.01)
USPC ................. 726/10; 709/229; 713/165; 726/4

(58) Field of Classification Search
CPC .................................................... H04L 63/0807
USPC .......................................................... 713/165
See application file for complete search history.

(56) References Cited

U.S. PATENT DOCUMENTS

| | | | | |
|---|---|---|---|---|
| 6,367,013 | B1 * | 4/2002 | Bisbee et al. | 713/178 |
| 6,678,733 | B1 * | 1/2004 | Brown et al. | 709/229 |
| 6,854,069 | B2 * | 2/2005 | Kampe et al. | 714/4 |
| 6,859,931 | B1 * | 2/2005 | Cheyer et al. | 719/317 |
| 7,036,146 | B1 * | 4/2006 | Goldsmith | 726/21 |
| 7,055,170 | B1 * | 5/2006 | Karmouch et al. | 726/2 |
| 7,154,868 | B1 * | 12/2006 | Sharma et al. | 370/331 |
| 7,227,863 | B1 * | 6/2007 | Leung et al. | 370/390 |

(Continued)

OTHER PUBLICATIONS

Jung et al., "Mobile Agent based Role Delegation Scheme," Journal of Korea Information Processing Society, 2007 Spring Conference, vol. 14, No. 1, May 2007, pp. 849-852 (with English Abstract).

(Continued)

*Primary Examiner* — Ashok Patel
*Assistant Examiner* — Andrew Goldberg
(74) *Attorney, Agent, or Firm* — RatnerPrestia (57) ABSTRACT

Disclosed is a method and system for controlling access for a mobile agent in a home network environment. The method includes the steps of: issuing a role ticket to the mobile agent; verifying access authority to service requested by the mobile agent through the role ticket; and granting the mobile agent access authority to the service. Accordingly, a table for managing access authority of a user is distributed to devices, so that it is possible to provide the mobile agent access control method and system capable of minimizing network traffic in the home network environment.

20 Claims, 8 Drawing Sheets

(56) References Cited

U.S. PATENT DOCUMENTS

| | | | | |
|---|---|---|---|---|
| 7,240,015 | B1* | 7/2007 | Karmouch et al. | 705/4 |
| 7,577,105 | B2* | 8/2009 | Takeyoshi et al. | 370/254 |
| 7,630,986 | B1* | 12/2009 | Herz et al. | 1/1 |
| 7,640,593 | B2* | 12/2009 | Tarkkala | 726/26 |
| 7,865,603 | B2* | 1/2011 | Braddy et al. | 709/229 |
| 7,870,153 | B2* | 1/2011 | Croft et al. | 707/781 |
| 2002/0026577 | A1* | 2/2002 | Futamura et al. | 713/156 |
| 2003/0197885 | A1* | 10/2003 | Takeo | 358/1.14 |
| 2004/0088347 | A1* | 5/2004 | Yeager et al. | 709/202 |
| 2004/0139426 | A1* | 7/2004 | Wu | 717/120 |
| 2004/0199765 | A1* | 10/2004 | Kohane et al. | 713/165 |
| 2004/0259562 | A1* | 12/2004 | Madour | 455/452.2 |
| 2005/0108575 | A1* | 5/2005 | Yung | 713/201 |
| 2005/0141706 | A1* | 6/2005 | Regli et al. | 380/44 |
| 2005/0177572 | A1* | 8/2005 | Verma et al. | 707/10 |
| 2005/0232429 | A1* | 10/2005 | Chowdhury et al. | 380/277 |
| 2005/0289650 | A1* | 12/2005 | Kalogridis | 726/22 |
| 2006/0225064 | A1* | 10/2006 | Lee et al. | 717/168 |
| 2007/0226808 | A1* | 9/2007 | Uchikawa | 726/27 |
| 2007/0282995 | A1* | 12/2007 | Mizuno et al. | 709/223 |
| 2008/0079539 | A1* | 4/2008 | Daley et al. | 340/7.29 |
| 2008/0104675 | A1* | 5/2008 | Kusano et al. | 726/4 |
| 2008/0144071 | A1* | 6/2008 | Uchikawa | 358/1.14 |
| 2008/0261630 | A1* | 10/2008 | Wormald et al. | 455/466 |
| 2009/0113538 | A1* | 4/2009 | Eom et al. | 726/12 |
| 2010/0046524 | A1* | 2/2010 | Rune et al. | 370/395.53 |

OTHER PUBLICATIONS

Cho et al., "Secure Lightweight Mobile Agent Platform for Ubiquitous Computing Environments,"Journal of UIT Research Group of Korea Information Processing Society, Oct. 2006, pp. 79-85 (with English Abstract).

Shin et al., "Policy Description Language for Ubiquitous Environment based on Context-aware Role-based Access Control," The Korean Institute of Information Scientists and Engineers, 07 Autumn Academic Presentation Journal, vol. 34, No. 2(C), pp. 521-525, Oct. 26, 2007 (with English Abstract).

KIPO Office Action for Korean Patent Application No. 10-2008-0103839 dated Feb. 17, 2010 (with English Translation).

* cited by examiner

FIG. 1

```
<?xml version="1.0" encoding="UTF-8"?>
<!ELEMENT UserMappingTable((UserMappingTableSpec)+)>
<!ELEMENT UserMappingTableSpec(User)*>
<!ATTLIST User Name ID #REQUIRED>
<!ELEMENT User (Role)*>
<!ATTLIST User Name ID #REQUIRED>
<!ELEMENT Role EMPTY>
<!ATTLIST Role RoleName CDATA #REQUIRED>
```

(a) DTD for representing relationship between user and role

```
<?xml version "1.0" encoding="UTF-8"?>
<!DOCTYPE UserMappingTable SYSTEM "UserMappingTable.dtd">
<UserMappingTable>
<UserMappingTableSpec Type = "DClabUser">
    <User Name="YoungwooJung">
        <Role RoleName="SystemAdmin"/>
        <Role RoleName="FamilyMember"/>
    </User>
    <User Name="GusuKim">
        <Role RoleName="FamilyMemberAdult"/>
    </User>
    <User Name="Hyunjincho">
        <Role RoleName="FamilyMemberTeenager"/>
    </User>
    <User Name="SKKU">
        <Role RoleName="PublicServant"/>
    </User>
</UserMappingTableSpec>
</UserMappingTable>
```

(b) XML for representing relationship between user and role

FIG. 2

```
<?xml version="1.0" encoding="UTF-8"?>
<!ELEMENT RoleHierarchyTable (RoleSpec)+>
<!ELEMENT RoleSpec (Role)+>
<!ATTLIST RoleSpec Type ID #REQUIRED>
<!ATTLIST RoleSpec MaxDepth CDATA #REQUIRED>
<!ELEMENT Role (Extends)*, (SSOD)*, (DSOD)*)>
<!ATTLIST Role RoleName ID #REQUIRED>
<!ELEMENT Extends EMPTY>
<!ATTLIST Extends RoleName IDREF #REQUIRED>
<!ELEMENT SSOD EMPTY>
<!ATTLIST Extends RoleName IDREF #REQUIRED>
<!ELEMENT DSOD EMPTY>
<!ATTLIST Extends RoleName IDREF #REQUIRED>
```

METHOD AND SYSTEM FOR CONTROLLING ACCESS FOR MOBILE AGENTS IN HOME NETWORK ENVIRONMENTS

FIELD OF THE INVENTION

The present invention relates to a method and system for controlling access for mobile agents in home network environments, and more particularly to a method and system for authenticating mobile agents and controlling access for the mobile agents in home network environments.

BACKGROUND

A home network environment is one of up-to-date living environments which incorporates digital devices in each home, wherein a large amount of network traffic is generated to control and manage these digital devices. Especially, a home gateway connecting a home network to the outside creates a communication bottleneck. In such home network environments, a mobile agent may be utilized as a new computing model. The agent, which basically is a software agent, corresponds to an autonomous process to perform a task for a specific purpose in place of the user, and has the characteristic of operating as a part of a certain environment or within the environment, without independent existence. Agents may be classified into static agents and mobile agents according to whether or not they have mobility. Each static agent can be executed only within a system which has created the static agent. In contrast, each mobile agent is not restricted to being executed within a system from which the mobile agent has started the execution thereof, can freely move to other servers through a network, and can also communicate with other servers or agents in order to obtain a required solution or to provide service. Therefore, once a mobile agent moves, a large amount of communication is not required between the mobile agent and a system where the mobile agent was created with a purpose, until the mobile agent achieves the purpose. Especially, the asynchronous performance capability and autonomy of the mobile agent makes it possible to significantly reduce network traffic generated in home network environments.

To this end, it is necessary to perform authentication and access control for mobile agents to access to a home network environment. However, according to the conventional authentication and role-based access control method for mobile agents, each mobile agent is allocated a role when the mobile agent is created. Particularly, in environments such as home network environments, where devices use mutually different access control policies, since each mobile agent must be dynamically allocated roles suitable for each home network environment, there is a limitation in applying the conventional authentication and access control methods for mobile agents to home network environments.

BRIEF DESCRIPTION

Therefore, the present invention has been made in view of the above-mentioned problems, and the present invention provides a method and system for controlling access for a mobile agent in home network environments.

Also, the present invention provides a method and system for controlling access for a mobile agent in home network environments, which distribute a table for managing the access authority of each user to devices, thereby minimizing network traffic.

Also, the present invention provides a method and system for controlling access for a mobile agent in home network environments, which enable each device to manage each mobile agent's authority for access to the device, thereby reducing the operation cost for table update in a home gateway server.

Also, the present invention provides a method and system for controlling access for a mobile agent in home network environments, which enable each device to maintain an independent service access control policy, thereby making it possible to achieve a more active service access control.

In addition, the present invention provides a method and system for controlling access for a mobile agent in home network environments, which enable a new device to be added to the home network environments, without a specific amendment to an access control policy.

In order to achieve the above-mentioned object, there is provided a method for controlling access for a mobile agent, the method including the steps of: issuing a role ticket to the mobile agent; verifying access authority to service requested by the mobile agent through the role ticket; and granting the mobile agent access authority to the service, wherein the role ticket includes authority information corresponding to a role of a device, which is to be performed by the mobile agent.

The method may further include the steps of: performing authentication for the mobile agent accessing a domain; and verifying integrity of the role ticket, wherein the domain corresponds to a region which is managed by a domain management server based on one access control policy.

The step of performing authentication for the mobile agent may include the steps of: receiving an authenticator transmitted from the mobile agent; and verifying integrity of data obtained by decoding a digital signature of the authenticator, wherein the authenticator includes an ID of the mobile agent, an ID of a home platform, a message digest of an execution code corresponding to the mobile agent, a lifetime of the authenticator, the digital signature, and a certificate.

The ID of the mobile agent may be granted by the home platform when the mobile agent is created, in which the home platform corresponds to a home platform from which the mobile agent has been created.

The message digest may include a bit stream which is created by applying a one-way hash function to the execution code of the mobile agent.

In the step of issuing the role ticket, roles that can be issued to the mobile agent may be checked by making reference to a user mapping table and a role hierarchy table, and the role ticket corresponding to the roles may be issued.

The user mapping table may include data which defines roles that can be issued to the mobile agent based on a user's identity.

The role hierarchy table may include data which defines a succession relationship between the roles.

The role ticket may include an ID of the mobile agent, a name of the role, a lifetime of the role ticket, and a digital signature.

The integrity verification may be performed in such a manner as to verify data obtained by decoding a digital signature by means of a public key.

In the step of verifying access authority to service, access authority to service may be verified by making reference to a service mapping table, in which the service mapping table includes data which defines a mapping relationship between the roles corresponding to the role ticket and access authority to the service.

In the step of granting access authority, an ID of the service and information about access authority to the service may be transmitted to the mobile agent.

According to another aspect of the present invention, there is provided a system for controlling access for a mobile agent in a home network environment, the system includes: a domain management server which is a gateway of a domain, the domain management server performing authentication for a mobile agent which accesses the domain, and issuing a role ticket; and a platform for performing an integrity verification on the role ticket, verifying access authority of the mobile agent, and granting access authority to service, wherein the domain corresponds to a region which is managed by the domain management server based on one access control policy.

The domain management server may receive an authenticator transmitted from the mobile agent, and verify integrity of data obtained by decoding a digital signature of the authenticator, in which the authenticator includes an ID of the mobile agent, an ID of a home platform, a message digest of an execution code corresponding to the mobile agent, a lifetime of the authenticator, the digital signature, and a certificate.

The ID of the mobile agent may be granted by the home platform when the mobile agent is created.

The message digest may include a bit stream which is created by applying a one-way hash function to the execution code of the mobile agent.

The domain management server may check roles that can be issued to the mobile agent by making reference to a user mapping table and a role hierarchy table, and issue the role ticket corresponding to the roles.

The user mapping table may include data which defines roles that can be issued to the mobile agent based on a user's identity.

The role hierarchy table may include data which defines a succession relationship between the roles.

The role ticket may include the ID of the mobile agent, a name of the role, a lifetime of the role ticket, and a digital signature.

The integrity verification may be performed in such a manner as to verify data obtained by decoding a digital signature included in the role ticket by means of a public key.

The platform may verify access authority to the service by making reference to a service mapping table, in which the service mapping table includes data which defines a mapping relationship between the roles corresponding to the role ticket and access authority to the service.

The platform may transmit an ID of the service and information about access authority to the service to the mobile agent in order to grant the access authority.

According to still another aspect of the present invention, there is provided a recording medium in which a program including instructions to be executed to perform an access control method for a mobile agent in an access control system of a home network environment is materially implemented, and is stored in such a manner as to be readable by the access control system, wherein the program includes the steps of: issuing a role ticket to the mobile agent; verifying access authority to service requested by the mobile agent through the role ticket; and granting the mobile agent access authority to the service.

According to the present invention, it is possible to provide a method and system for controlling access for mobile agents in home network environments.

Also, according to the present invention, it is possible to provide a method and system for controlling access for mobile agents in home network environments, which can minimize network traffic by distributing a table for managing the access authority of each user to each device.

Also, according to the present invention, it is possible to provide a method and system for controlling access for a mobile agent in home network environments, which can reduce the operation cost for table update in a home gateway server by enabling each device to manage each mobile agent's authority for access to the device.

Also, according to the present invention, it is possible to provide a method and system for controlling access for a mobile agent in home network environments, which can achieve a more active service access control by enabling each device to maintain an independent service access control policy.

Also, according to the present invention, it is possible to provide a method and system for controlling access for a mobile agent in home network environments, which enable a new device to be added to the home network environments without a specific amendment to an access control policy.

In addition, according to the present invention, a separate role ticket is issued for each role, thereby preventing unnecessary information exposure to a platform.

BRIEF DESCRIPTION OF THE DRAWINGS

The foregoing and other objects, features and advantages of the present invention will become more apparent from the following detailed description when taken in conjunction with the accompanying drawings in which.

DETAILED DESCRIPTION

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. In the following description, a detailed description of known functions and configurations incorporated herein will be omitted when it may obscure the subject matter of the present invention.

It will be understood that, although the terms first, second, etc. may be used herein to describe various elements, these elements should not be limited by these terms. These terms are only used to distinguish one element from another.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Hereinafter, an exemplary embodiment of the present invention will be described in detail with reference to the accompanying drawings.

A system for controlling access for a mobile agent in a home network environment will now be described with reference to FIGS. 1 to 4.

Figure 1:
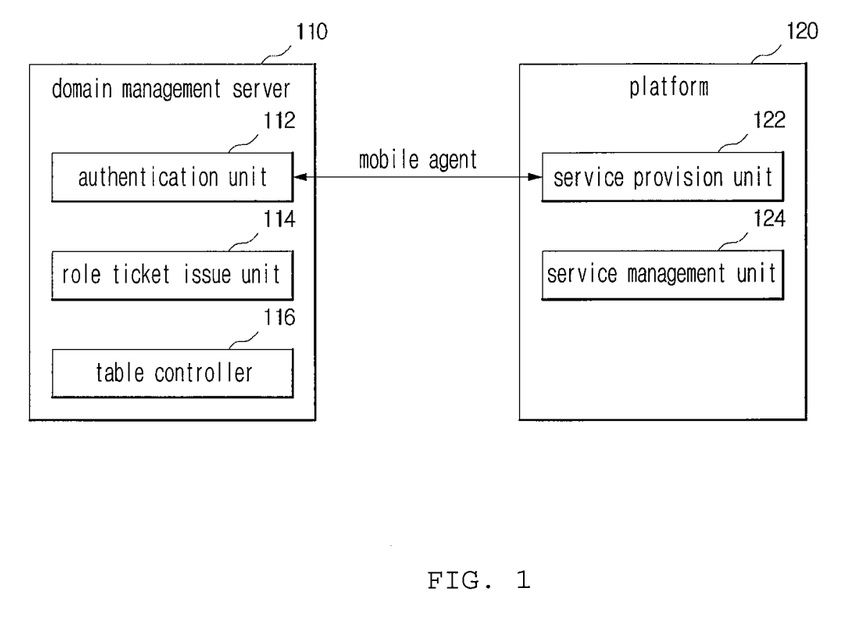
FIG. 1 is a block diagram illustrating the configuration of a system for controlling access for a mobile agent in a home network environment according to an exemplary embodiment of the present invention.
Figure 2:
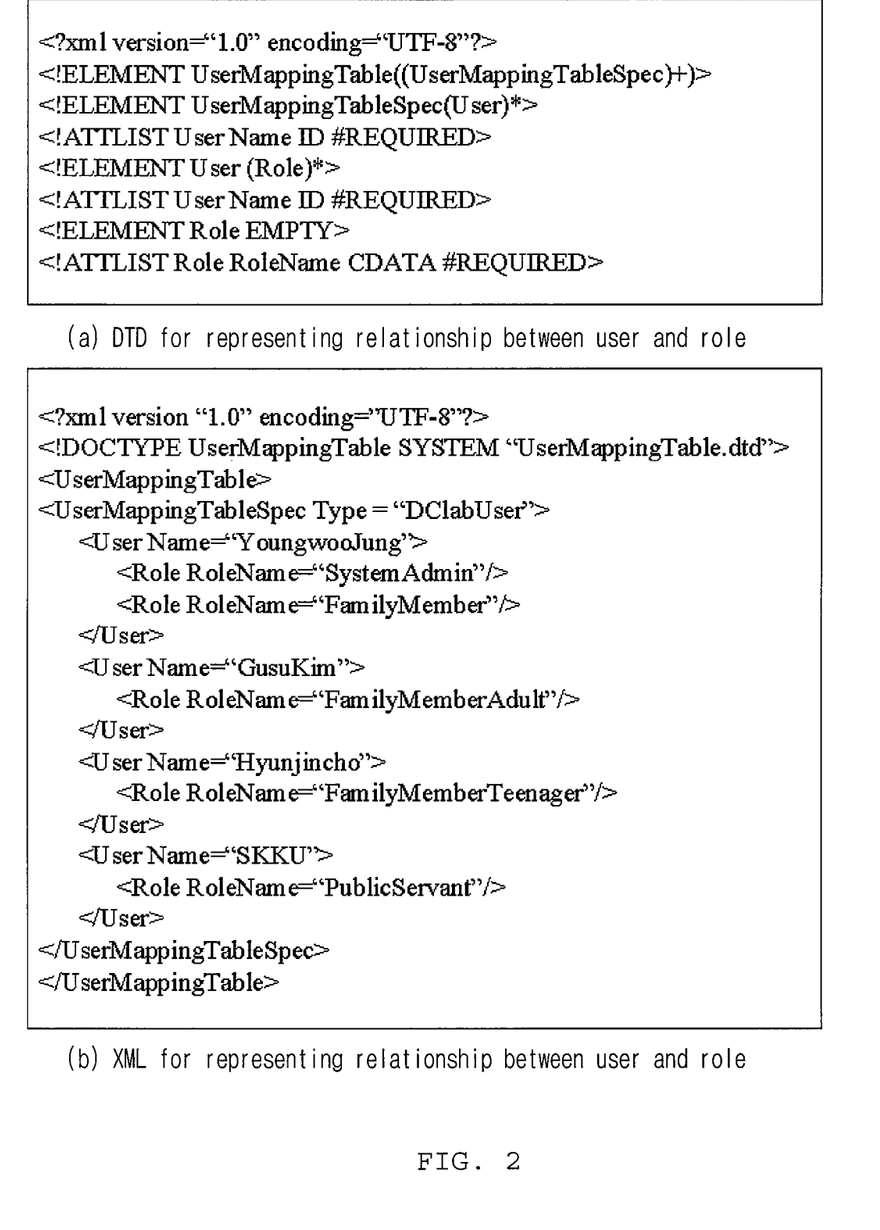
FIG. 2A is a view illustrating a Document Type Definition (DTD) of a user mapping table according to an exemplary embodiment of the present invention.
FIG. 2B is a view illustrating an Extensible Markup Language (XML) of a user mapping table according to an exemplary embodiment of the present invention.
Figure 3:
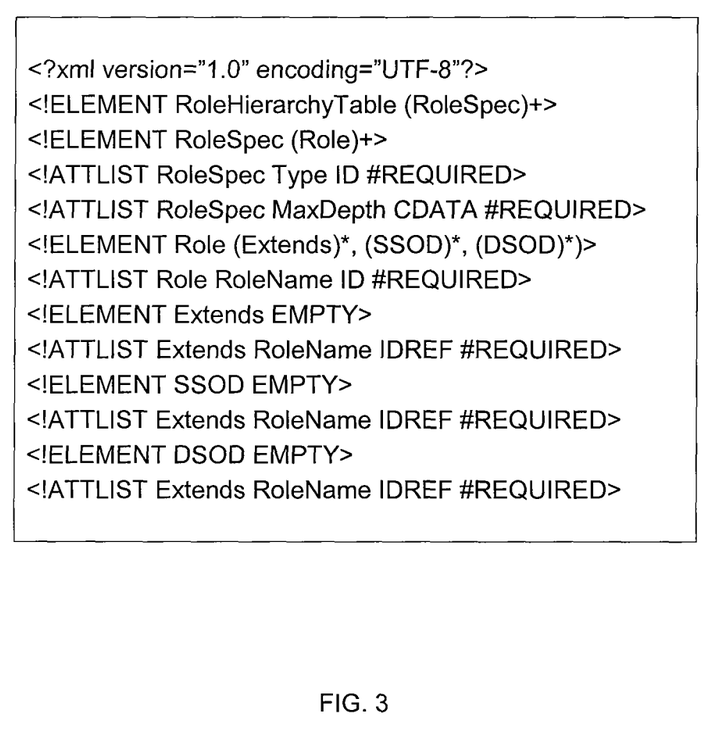
FIG. 3 is a view illustrating a DTD of a role hierarchy table according to an exemplary embodiment of the present invention.
Figure 4:
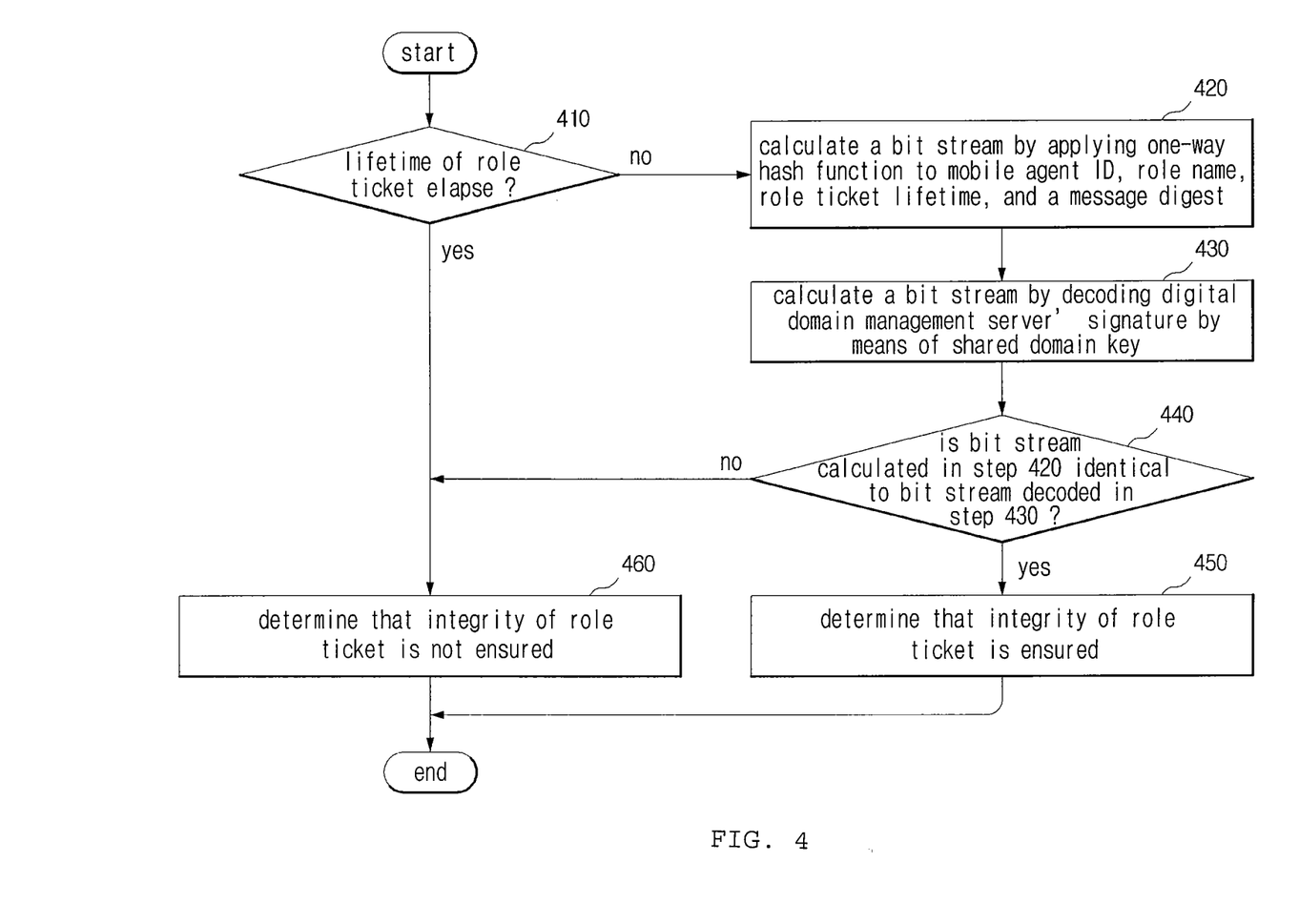
FIG. 4 is a flowchart illustrating a procedure of checking a domain management server's signature included in a role ticket according to an exemplary embodiment of the present invention.

FIG. 1 is a block diagram illustrating the configuration of a system for controlling access for a mobile agent in a home network environment according to an exemplary embodiment of the present invention, FIG. 2A is a view illustrating a Document Type Definition (DTD) of a user mapping table according to an exemplary embodiment of the present invention, FIG. 2B is a view illustrating an Extensible Markup Language (XML) of a user mapping table according to an exemplary embodiment of the present invention, FIG. 3 is a view illustrating a DTD of a role hierarchy table according to an exemplary embodiment of the present invention, and FIG. 4 is a flowchart illustrating a procedure of checking a domain management server's signature included in a role ticket according to an exemplary embodiment of the present invention.

Referring to FIG. 1, a system 100 for controlling access for a mobile agent according to an exemplary embodiment of the present invention includes a domain management server 110 and a platform 120.

The domain management server 110 corresponds to a gateway for a domain, and performs authentication and role ticket issue operations on a mobile agent accessing the domain. The domain management server 110 includes an authentication unit 112, a role ticket issue unit 114, and a table controller 116.

The authentication unit 112 performs authentication for a mobile agent accessing the domain. For example, the authentication unit 112 may perform an authentication process with respect to an authenticator of a mobile agent accessing the domain. The authenticator may be created at the time of generating the mobile agent by a home platform, which is operated by the user, and may be stored in the mobile agent. The authenticator includes an ID of the mobile agent, an ID of the home platform, a message digest, information about a lifetime of the authenticator, a digital signature signed by a private key of the home platform with respect to the aforementioned pieces of information, and a certificate for certifying these contents. The authenticator may be expressed as follows:

$$\text{Authenticator} = \{AID|HPID|MD|TS|Cert_{K_U}|Sign_{K_R}(H(AID|HPID|MD|TS))\}.$$

Here, "Authenticator" represents an authentication code, "AID" represents an ID of a mobile agent, "HPID" represents an ID of a home platform, "MD" represents a message digest, "TS" represents a lifetime of the authenticator, "$Cert_{K_U}$" represents a certificate, and "$SignK_R(H(AID|HPID|MD|TS))$" represents a digital signature signed by a private key of the home platform.

The authentication unit 112 decodes the signature, which has been signed by an authenticator, by means of a public key, and verifies integrity of the decoded value, thereby performing an authentication. In this case, the authentication unit 112 may obtain the public key, which is used in the decoding step, from the certificate of the home platform.

The role ticket issue unit 114 issues a role ticket, which includes authority information corresponding to roles of devices to be performed through a mobile agent, to the mobile agent which has been successfully authenticated. For example, the role ticket issue unit 114 creates a role ticket, which can be issued to a mobile agent, by making reference to a user mapping table and a role hierarchy table, and allocates the created role ticket. A role ticket may include an ID of a mobile agent, a role name, a lifetime of the role ticket, and a signature. In this case, the signature is created by encrypting a bit stream, which has been obtained by applying a hash function to the mobile agent ID, the role name, and a message digest, by means of a shared domain key. The structure of the role ticket may be expressed as follows:

$$T = (AID|NAME_{role}|TS|E_{K_m}(H(AID|NAME_{role}|TS|MD))).$$

Here, "T" represents a role ticket, "AID" represents an ID of a mobile agent, "$NAME_{role}$" represents a role name, "TS" represents a lifetime of the role ticket, and "$EK_m(H(AID|NAME_{role}|TS|MD))$" represents a digital signature signed by a shared domain key with respect to information about the role ticket.

The user mapping table and the role hierarchy table will be described in detail later. Meanwhile, the role ticket issue unit 114 may issue separate role tickets according to roles. If one role ticket is issued for a plurality of roles, even information unnecessary for a platform is exposed to the platform when a mobile agent transfers the role ticket to the platform in order to request service. In order to prevent such a problem, the role ticket issue unit 114 may issue only one role ticket for each role.

The table controller 116 creates and manages a user mapping table and a role hierarchy table, and provides each table to the role ticket issue unit 114. The user mapping table defines a relation between users and roles so as to represent information about which role is to be granted to each user, and may be created by a manager upon domain formation. In this case, the user mapping table may be formed based on XML, etc., for example, in the format of DTD shown in FIG. 2A or in the format of XML shown in FIG. 2B.

The role hierarchy table represents a hierarchical relationship between roles used in a domain. The hierarchical relationship between roles makes it possible to succeed to an authority. For example, the "FamilyMemberAdult" and the "FamilyMemberTeenager" shown in FIG. 2B succeed to the authority of the "FamilyMember." The table controller 116 expresses and manages such hierarchical relationship between roles in the format of XML, as shown in FIG. 3.

The platform 120 is included in devices which correspond to terminals of a home network, and is controlled by a mobile agent received from the domain management server 110. The platform 120 includes a service provision unit 122 and a service management unit 124.

The service provision unit 122 performs an integrity verification on a role ticket. For example, the service provision unit 122 verifies a digital signature of the domain management server 110, which is included in a role ticket, thereby determining integrity of the role ticket. Hereinafter, a procedure in which the service provision unit 122 verifies a digital signature will be described with reference to FIG. 4.

In step 410, the service provision unit 122 verifies a lifetime of a role ticket.

When it is determined in step 410 that the role ticket is valid, the service provision unit 122 calculates a bit stream by applying a one-way hash function to a mobile agent ID, a role name, the lifetime of the role ticket, and a message digest in step 420. The procedure of calculating a bit stream by applying a one-way hash function is generally known in the art, so a description thereof will be omitted.

In contrast, when it is determined in step 410 that the role ticket is invalid, the service provision unit 122 determines that the role ticket is invalid, and denies a service request of the mobile agent (step 460).

In step 430, the service provision unit 122 decodes the digital signature of the domain management server by means of a shared domain key, thereby calculating a bit stream.

In step 440, the service provision unit 122 determines if the bit stream calculated in step 420 is identical to the bit stream decoded in step 430.

When it is determined that the two bit streams are identical to each other, the service provision unit 122 determines that the role ticket is appropriate, i.e., that the integrity of the role ticket is ensured in step 450.

In contrast, when it is determined that the two bit streams are not identical to each other, the service provision unit 122 determines that the role ticket is invalid, i.e., that the integrity of the role ticket is not ensured, and denies the service request of the mobile agent (step 460).

An algorithm used in the digital signature verification procedure may be expressed by:

```
verifyRoleTicket(MD',T){
(1)    if (verifyTS(TS'= getTS(T)) == false)
            return false;
(2)    AID'        = getAID(T);
(3)    NAME_role'  = getRoleName(T);
(4)    Sign'       = getSign(T);
(5)    a = H(AID'|NAME_role'|TS'|MD');
(6)    b = DK_m(Sign');
(7)    if (a==b)
            return true ;
       else
            return false ;
}
```

Here, "verifyRoleTicket(MD',T)" represents a function for an algorithm using a role ticket and a message digest, "verifyTS(TS')" represents a function for verifying a lifetime, "getTS(T)" represents a function of extracting the lifetime of the role ticket, "getAID(T)" represents a function of extracting a mobile agent ID of the role ticket, "getSign(T) represents a function of extracting a digital signature of the role ticket, "H(A)" represents a function of calculating a bit stream by applying a one-way hash function to information "A," and "Dk$_m$(Sign')" represents a function of calculating a bit stream by decoding a digital signature of a domain management server by means of a shared domain key. The operating procedure of each function has no direct relation to the present invention, so a detailed description thereof will be omitted.

Referring again to FIG. 1, when it is determined in the aforementioned algorithm that the integrity of the role ticket is ensured, the service provision unit 122 provides an ID of service requested by the mobile agent, together with a role name included in the role ticket, to the service management unit 124.

Also, the service provision unit 122 receives authority information from the service management unit 124, and provides the service ID and the authority information to the mobile agent, thereby granting the authority for the service to the mobile agent.

The service management unit 124 checks the authority for the service requested by the mobile agent, by checking a pre-stored service mapping table. The service mapping table stores data about authority for access to service corresponding to each role. When the service management unit 124 has verified the authority for requested service, the service management unit 124 transmits authority information to the service provision unit 122.

Hereinafter, an execution procedure of the access control system 100 for a mobile agent in a home network environment according to an exemplary embodiment of the present invention will be described with reference to FIG. 5 and functional units of FIG. 1. In the following description, it is assumed that a boiler and a water-supply apparatus include platforms 210 connected to a home network so as to be controlled by a mobile agent.

Figure 5:
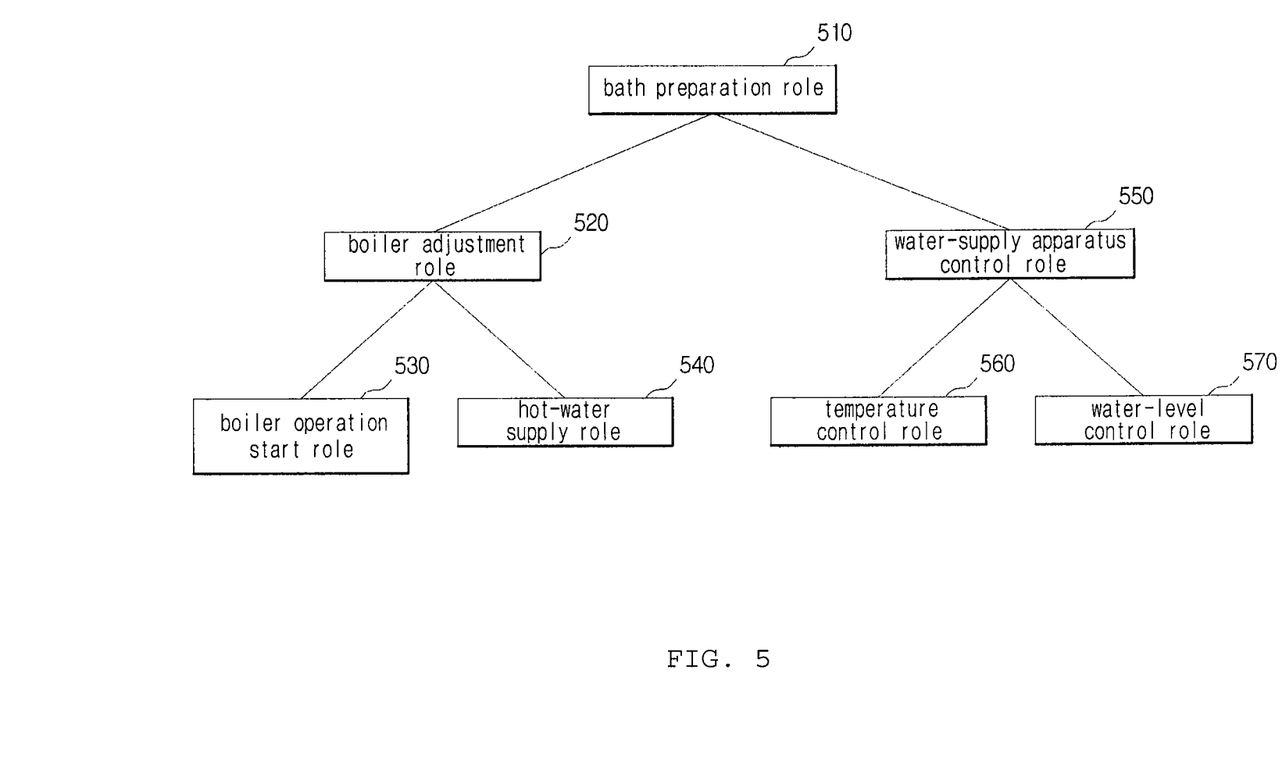
FIG. 5 is a view illustrating a hierarchical relationship between a bath preparation role and the lower roles thereof.

FIG. 5 is a view illustrating a hierarchical relationship between a bath preparation role and the lower roles thereof.

A platform 120 included in a portable terminal recognizes an instruction for performance of a bath preparation role 510, input from the user, and creates a mobile agent corresponding to the recognized instruction.

The created mobile agent is transmitted to the domain management server 110 through a communication network. The authentication unit 112 of the domain management server 110 performs authentication for the mobile agent. Then, the role ticket issue unit 114 requests the table controller 116 to transfer information about the bath preparation role 510. The table controller 116 verifies the user's identity who has issued the instruction for performance of the bath preparation role 510, and determines if there is a role corresponding to the instruction for performance of the bath preparation role 510 by making reference to a user mapping table. Then, the table controller 116 transmits information about the bath preparation role 510 and its lower roles to the role ticket issue unit 114. Here, for better understanding of the present invention, it is assumed that the bath preparation role 510 has lower roles as shown in FIG. 5. The role ticket issue unit 114 issues a role ticket, which corresponds to roles based on role information received from the table controller 116, shown in FIG. 5, to the mobile agent. The mobile agent moves to the platform of the boiler required to perform the bath preparation role 510.

The service provision unit 122 of the platform 120 included in the boiler performs an integrity verification of the role ticket according to a boiler operation start role 530 and a hot-water supply role 540, which are lower roles of a boiler adjustment role 520 issued to the mobile agent. Since the integrity verification procedure has been described in detail with reference to FIG. 4, a detailed description thereof will be omitted. Then, the service management unit 124 checks roles corresponding to the role ticket, and access authority to service which can be provided by the boiler, and then transmits authority information about the service corresponding to the boiler operation start role 530 and hot-water supply role 540 to the service provision unit 122. The service provision unit 122 grants an ID and authority information for the service corresponding to the boiler operation start role 530 and hot-water supply role 540 to the mobile agent so that the mobile agent can control the corresponding service. The mobile agent operates and controls the boiler to perform a hot-water supply function, based on the granted authority.

Then, the mobile agent moves to a platform 120 included in the water-supply apparatus. The mobile agent is authorized to control service corresponding to a temperature control role 560 and a water-level control role 570, which are lower roles of a water-supply apparatus control role 550, through the same procedure as that performed by the platform 120 included in the boiler. The mobile agent controls the water-supply apparatus to fill a bathtub with warm water suitable for bathing up to an appropriate water level, based on the granted authority. A procedure in which the mobile agent controls the service has no direct relation to the present invention, so a detailed description thereof will be omitted.

Thereafter, the mobile agent may move the portable terminal through a communication network so as to inform the user that the bath preparation has been completed, or may transmit a message to the portable terminal through the domain management server 110.

While the embodiment of the present invention has been described about the case where the mobile agent uses the platform of a boiler and the platform of a water-supply apparatus, the mobile agent according to the present invention is not limited thereto, but the mobile agent can use and control the respective platforms included in various devices.

Hereinafter, a method of controlling access for a mobile agent in a home network environment according to an exemplary embodiment of the present invention will be described with reference to FIG. 6. Although the respective steps described below may be performed by each component included in the access control system 100, the respective steps will be described as being generally performed by the access control system 100, for better understanding and convenience of description.

Figure 6:
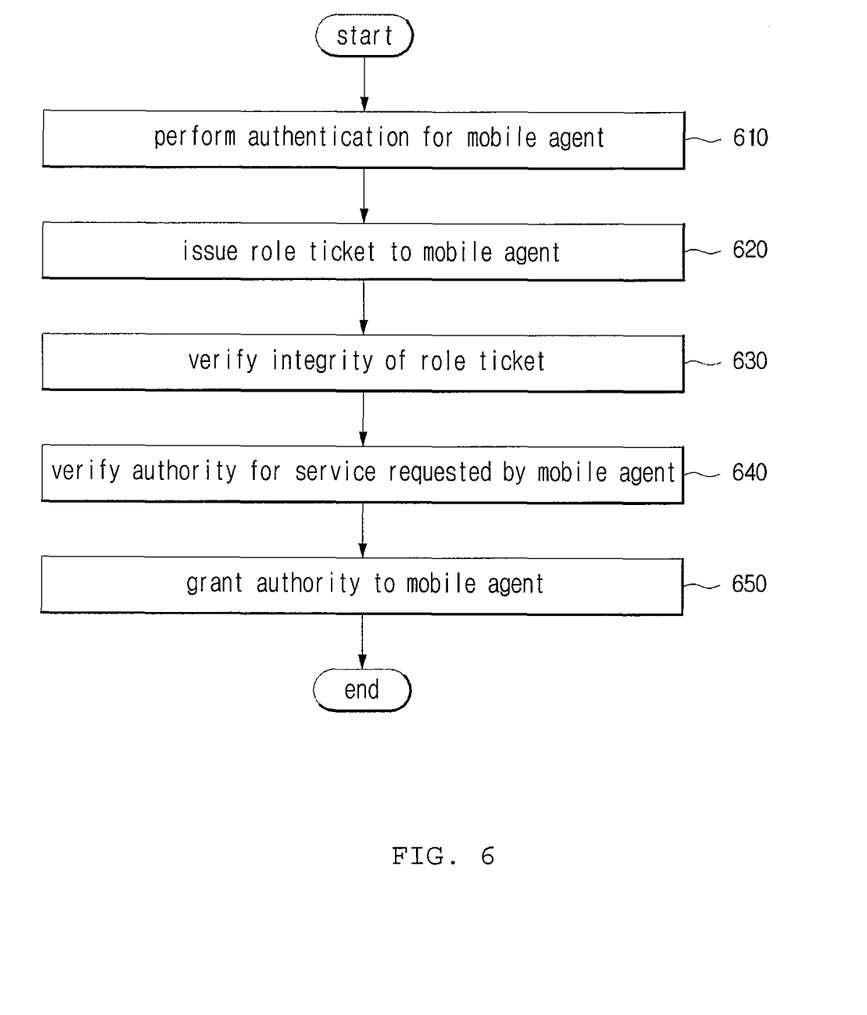
FIG. 6 is a flowchart illustrating a procedure of controlling access for a mobile agent in a home network environment according to an exemplary embodiment of the present invention.

FIG. 6 is a flowchart illustrating a procedure of controlling access for a mobile agent in a home network environment according to an exemplary embodiment of the present invention.

In step 610, the access control system 100 performs authentication for a mobile agent accessing a domain. In this case, the access control system 100 performs the authentication in such a manner as to decode a digital signature of an authenticator included in the mobile agent, and to verify integrity of the resultant value.

In step 620, the access control system 100 issues a role ticket to the mobile agent. In this case, the access control system 100 may issue a role ticket corresponding to the respective required roles to the mobile agent.

In step 630, the access control system 100 performs an integrity verification on the role ticket issued to the mobile agent. The access control system 100 performs the integrity verification in such a manner as to verify a signature included in the role ticket. Since the method of verifying a signature has been described with reference to FIG. 4, a description thereof will be omitted.

In step 640, the access control system 100 checks authority corresponding service requested by the mobile agent. The access control system 100 may check the authority corresponding to the service by means of a service mapping table which defines a mapping relationship between roles and service access authorities.

In step 650, the access control system 100 grants the mobile agent the authority for the service requested by the mobile agent.

Hereinafter, a procedure in which the domain management server 110 authorizes a mobile agent will be described with reference to FIG. 7.

Figure 7:
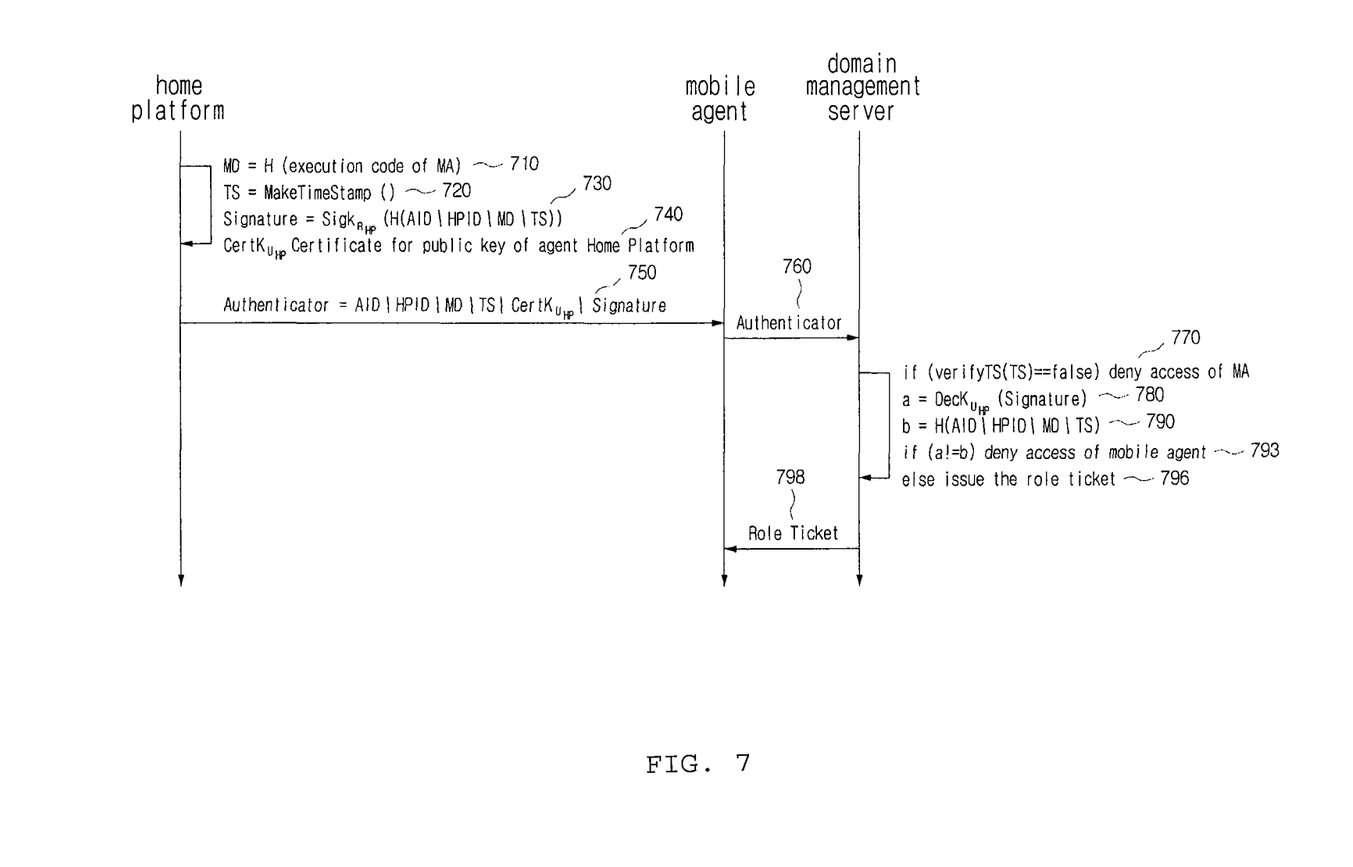
FIG. 7 is a flowchart illustrating a procedure in which a domain management server authorizes a mobile agent accessing a domain.

FIG. 7 is a flowchart illustrating a procedure in which a domain management server authorizes a mobile agent accessing a domain.

In step 710, a home platform (not shown) calculates a message digest by applying a one-way hash function to an execution code included in the mobile agent.

In step 720, the home platform creates a lifetime of the mobile agent. A method of creating the lifetime is well known to those skilled in the art, and may be implemented in various schemes, so a detailed description thereof will be omitted.

In step 730, the home platform affixes a digital signature for an ID of the mobile agent, an ID of the home platform, the message digest calculated in step 710, and the lifetime created in step 720.

In step 740, the home platform creates a certificate required for verifying the digital signature created in step 730.

In step 750, the home platform creates an authenticator which includes the ID of the mobile agent, the ID of the home platform, the message digest calculated in step 710, the lifetime created in step 720, the digital signature created in step 730, and the certificate created in step 740, and then transfers the authenticator to the mobile agent.

In step 760, the mobile agent accesses the domain management server 110 through a communication network, and transfers the authenticator to the domain management server 110.

In step 770, the domain management server 110 verifies the lifetime included in the transferred authenticator, wherein the domain management server 110 denies access of the mobile agent if the lifetime is invalid.

In step 780, the domain management server 110 decodes the digital signature included in the transferred authenticator by means of a public key of the home platform.

In step 790, the domain management server 110 applies a one-way hash function to the ID of the mobile agent, the ID of the home platform, the message digest, and the lifetime, which are included in the transferred authenticator, thereby obtaining a bit stream.

In step 793, the domain management server 110 compares two pieces of data obtained in steps 780 and 790 to each other. If the two pieces of data are not identical to each other, the domain management server 110 denies access of the mobile agent.

In contrast, when the two pieces of data are identical to each other, the domain management server 110 issues a role ticket in step 796.

In step 798, the domain management server 110 transfers the issued role ticket to the mobile agent.

Hereinafter, a method in which a platform 120 controls access of a mobile agent will be described with reference to FIG. 8.

Figure 8:
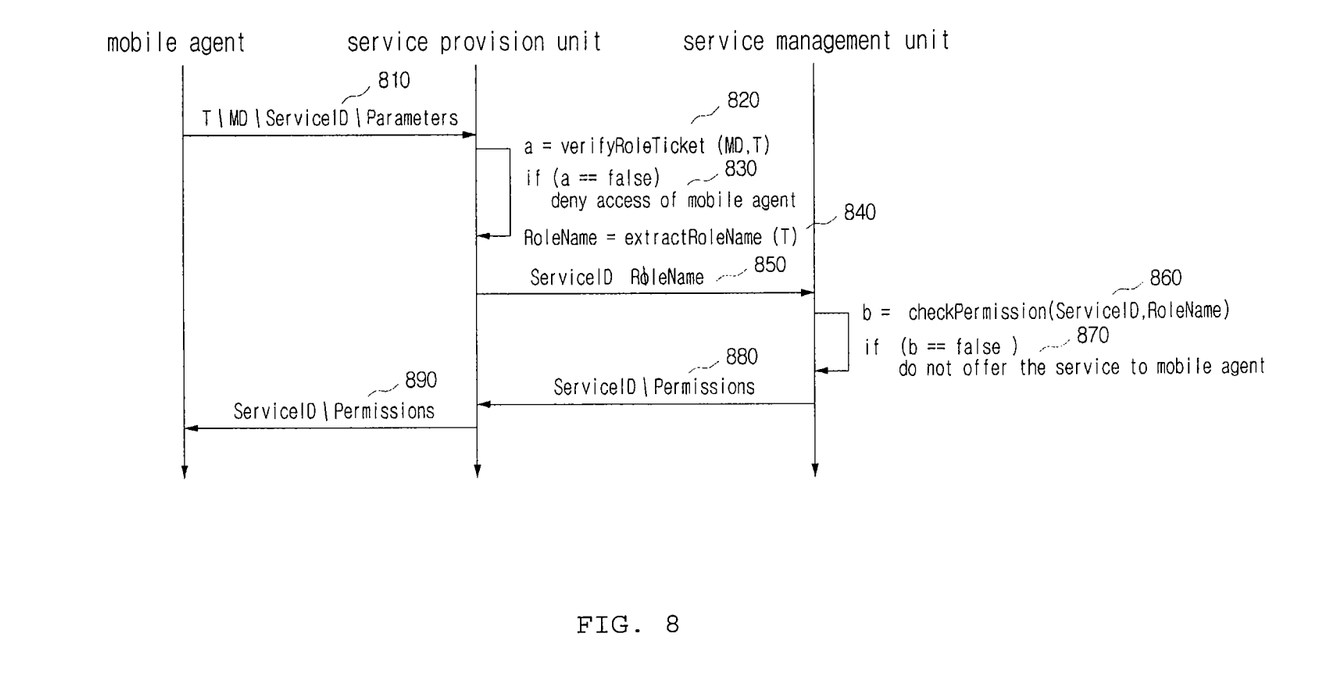
FIG. 8 is a flowchart illustrating a procedure in which a platform controls access of a mobile agent.

FIG. 8 is a flowchart illustrating a procedure in which a platform controls access of a mobile agent.

In step 810, the mobile agent transfers a role ticket, a message digest, a service ID, and parameters required for service use to a service provision unit 122.

In step 820, the service provision unit 122 verifies integrity of the role ticket by using the algorithm described in detail with reference to FIG. 4.

When it is determined that the integrity of the role ticket is not ensured, the service provision unit 122 denies access of the mobile agent in step 830.

In contrast, when it is determined that the integrity of the role ticket is ensured, the service provision unit 122 extracts a role name from the role ticket in step 840.

In step 850, the service provision unit 122 transfers the service ID and the role name to the service management unit 124.

In step 860, the service management unit 124 verifies the access authority to service corresponding to the role name.

When it is determined that there is no authority corresponding to the role, the service management unit 124 does not provide service to the mobile agent and terminates the access control procedure in step 870.

In contrast, when it is determined that there is authority corresponding to the role, the service management unit 124 transfers the service ID and authority information to the service provision unit 122 in step 880.

In step 890, the service provision unit 122 transfers the service ID and authority information to the mobile agent.

Although several preferred embodiments of the present invention have been described for illustrative purposes, those skilled in the art will appreciate that various modifications, additions and substitutions are possible, without departing from the scope and spirit of the invention as disclosed in the accompanying claims.

The invention claimed is:

1. A method for controlling access for a mobile agent, the method comprising the steps of:
   transmitting the mobile agent and a role to a domain management server;
   determining, by the domain management server, a service of a platform corresponding to the role;
   issuing, by the domain management server, a role ticket to the mobile agent based on the service of the platform;
   transmitting the mobile agent and the role ticket to the platform;
   verifying, by the platform, access authority to the service requested by the mobile agent through the role ticket;
   granting, by the platform, the mobile agent access authority to the service, and
   performing authentication for the mobile agent accessing a domain,
   wherein the role ticket authorizes the mobile agent to perform the service on the platform,
   wherein the step of performing authentication for the mobile agent comprises the steps of:
      receiving an authenticator transmitted from the mobile agent; and
      verifying integrity of data obtained by decoding a digital signature of the authenticator,
   wherein the authenticator comprises an ID of the mobile agent, an ID of a home platform, a message digest of an execution code corresponding to the mobile agent, a lifetime of the authenticator, the digital signature, and a certificate, and
   wherein the ID of the mobile agent is granted by the home platform when the mobile agent is created, in which the home platform corresponds to a home platform from which the mobile agent has been created.

2. The method as claimed in claim 1, further comprising the steps of:
   verifying integrity of the role ticket,
   wherein the domain corresponds to a region which is managed by a domain management server based on one access control policy.

3. The method as claimed in claim 1, wherein the message digest includes a bit stream which is created by applying a one-way hash function to the execution code of the mobile agent.

4. The method as claimed in claim 1, wherein, in the step of issuing the role ticket, roles issued to the mobile agent are verified by making reference to a user mapping table and a role hierarchy table stored on the domain management server.

5. The method as claimed in claim 4, wherein the user mapping table includes data which defines roles that can be issued to the mobile agent based on a user's identity.

6. The method as claimed in claim 4, wherein the role hierarchy table includes data which defines a succession relationship between the roles.

7. The method as claimed in claim 4, wherein the role ticket comprises an ID of the mobile agent, a name of the role, a lifetime of the role ticket, and a digital signature.

8. The method as claimed in claim 2, wherein the integrity verification is performed in such a manner as to verify data obtained by decoding a digital signature by means of a public key.

9. The method as claimed in claim 4, wherein, in the step of verifying access authority to service, access authority to service is verified by making reference to a service mapping table, in which the service mapping table includes data which defines a mapping relationship between the roles corresponding to the role ticket and access authority to the service.

10. The method as claimed in claim 9, wherein, in the step of granting access authority, an ID of the service and information about access authority to the service are transmitted to the mobile agent.

11. A system for controlling access for a mobile agent in a home network environment, the system comprises:
   a domain management server which is a gateway of a domain, the domain management server performing authentication for a mobile agent which accesses the domain, and issuing a role ticket; and
   a platform for performing an integrity verification on the role ticket, verifying access authority of the mobile agent, and granting access authority to service,
   wherein:
      the domain management server is configured to receive the mobile agent and a role, determine a service of the platform corresponding to the role, issue a role ticket to the mobile agent based on the service of the platform, and transmit the mobile agent and role ticket to the platform,
      the platform is configured to verify access authority to the service requested by the mobile agent through the role ticket, and grant mobile agent access authority to the service, and
   wherein the domain corresponds to a region which is managed by the domain management server based on one access control policy,
   wherein the domain management server receives an authenticator transmitted from the mobile agent, and verifies integrity of data obtained by decoding a digital signature of the authenticator, in which the authenticator comprises an ID of the mobile agent, an ID of a home platform, a message digest of an execution code corresponding to the mobile agent, a lifetime of the authenticator, the digital signature, and a certificate, and
   wherein the ID of the mobile agent is granted by the home platform when the mobile agent is created.

12. The system as claimed in claim 11, wherein the message digest includes a bit stream which is created by applying a one-way hash function to the execution code of the mobile agent.

13. The system as claimed in claim 12, wherein, the domain management server checks roles that can be issued to the mobile agent by making reference to a user mapping table and a role hierarchy table, and issues the role ticket corresponding to the roles.

14. The system as claimed in claim 13, wherein the user mapping table includes data which defines roles that can be issued to the mobile agent based on a user's identity.

15. The system as claimed in claim 13, wherein the role hierarchy table includes data which defines a succession relationship between the roles.

16. The system as claimed in claim 15, wherein the role ticket comprises the ID of the mobile agent, a name of the role, a lifetime of the role ticket, and a digital signature.

17. The system as claimed in claim 11, wherein the integrity verification is performed in such a manner as to verify data obtained by decoding a digital signature included in the role ticket by means of a public key.

18. The system as claimed in claim 13, wherein, the platform verifies access authority to the service by making reference to a service mapping table, in which the service mapping table includes data which defines a mapping relationship between the roles corresponding to the role ticket and access authority to the service.

19. The system as claimed in claim 18, wherein the platform transmits an ID of the service and information about access authority to the service to the mobile agent in order to grant the access authority.

20. A non-transitory computer readable recording medium in which a program including instructions to be executed to perform an access control method for a mobile agent in an access control system of a home network environment is materially implemented, and is stored in such a manner as to be readable by the access control system, wherein the program comprises the steps of:

transmitting the mobile agent and a role to a domain management server;

determining, by the domain management server, a service of a platform corresponding to the role;

issuing, by the domain management server, a role ticket to the mobile agent based on the service of the platform;

transmitting the mobile agent and role ticket to the platform;

verifying, by the platform, access authority to the service requested by the mobile agent through the role ticket;

granting, by the platform, the mobile agent access authority to the service, and     performing authentication for the mobile agent accessing a domain, wherein the role ticket authorizes the mobile agent to perform the service on the platform, wherein the step of performing authentication for the mobile agent comprises the steps of:

receiving an authenticator transmitted from the mobile agent; and     verifying integrity of data obtained by decoding a digital signature of the authenticator, wherein the authenticator comprises an ID of the mobile agent, an ID of a home platform, a message digest of an execution code corresponding to the mobile agent, a lifetime of the authenticator, the digital signature, and a certificate, and wherein the ID of the mobile agent is granted by the home platform when the mobile agent is created, in which the home platform corresponds to a home platform from which the mobile agent has been created.

\* \* \* \* \*